March 17, 1953 — W. W. ODELL — 2,631,921
CONTACTING FLUID AND SOLIDS
Original Filed Aug. 10, 1946 — 3 Sheets-Sheet 1

Fig.-1

William W. Odell, Inventor
By J. Cashman, Attorney

March 17, 1953     W. W. ODELL     2,631,921
CONTACTING FLUID AND SOLIDS Original Filed Aug. 10, 1946     3 Sheets—Sheet 2

William W. Odell Inventor
By J. Cushman Attorney

Fig.-3

William W. Odell Inventor
By J. Cashman Attorney

Patented Mar. 17, 1953

2,631,921

UNITED STATES PATENT OFFICE 2,631,921

CONTACTING FLUID AND SOLIDS

William W. Odell, New York, N. Y., assignor to Standard Oil Development Company, a corporation of Delaware Original application August 10, 1946, Serial No. 689,674. Divided and this application February 24, 1949, Serial No. 78,152

4 Claims. (Cl. 23—1)

This application is a division of a copending application Serial No. 689,674, filed August 10, 1946, now abandoned, for "Contacting Fluid and Solids."

This invention relates to a process and apparatus for treating materials, particularly for promoting chemical reactions. It relates to the treating of gases and vapors and also the treating of solids in a small physical state. In particular, it deals with effects resulting from contacting solids with a fluid stream under controlled temperature conditions. It also deals with apparatus in which particular results can be obtained.

One of the objects of this invention is to economize heat in promoting reactions employing a fluidized bed of solids, or a bed of hot solids in a state of motion. Another object is to beneficiate a gas or vapor efficiently by contacting it in or as a fluid stream with small-size solids. Another object is to use a plurality of sizes of solids for contacting a reactant fluid stream for the purpose of better heat transfer and better control over degree of reaction. A further object is to make possible the maintenance of a zone of chosen temperatures within a fluidized mass of small-size solids which temperature is different from that of an adjacent upper or lower zone. The chosen temperature zone may be in the middle, above or below the middle of the fluidized bed and it may be appreciably hotter than an adjacent zone at a different level. The fluidized solids may be held at different temperatures in different zones partly by controlling the degree of freedom of motion of the said solids in the different zones or in a particular zone. This invention is a continuation-in-part of my application Serial No. 582,692, filed March 14, 1945, now Patent No. 2,503,291 for a process of treating materials. Other objects will become evident from the following disclosures and claims.

In order to clarify the intent and purpose of this invention at the outset, before describing it by examples, it may be said that it is believed to be applicable to operations which include the following: oxidation and reduction reactions; exothermic and endothermic reactions; polymerization; carbonization of finely-divided coal; gasification of finely-divided solid carbonaceous fuel; production of carbon black; reforming of hydrocarbons, particularly gases and vapors; and cracking of hydrocarbon compounds with or without appreciable formation of carbon. Some of these reactions in simple form are typified by Equations 1 to 17, inclusive, as follows:

(1) $2CO = C + CO_2$
(2) $2CH_4 + O_2 = 2CO + 4H_2$
(3) $CO + 3H_2 = CH_4 + H_2O$
(4) $CH_4 + CO_2 = 2CO + 2H_2$
(5) $CH_4 + 2H_2O = CO_2 + 4H_2$
(6) $4CO + 8H_2 = C_4H_8 + 4H_2O$
(7) $4CO + 9H_2 = C_4H_{10} + 4H_2O$
(8) $8CO + 4H_2 = C_4H_8 + 4CO_2$
(9) $C + H_2O = CO + H_2$
(10) $2C + O_2 = 2CO$
(11) $3CH_4 + O_2 + H_2O = 3CO + 7H_2$
(12) $18CH_4 + 8O_2 + 5H_2O = 15CO + 3CO_2 + 41H_2$
(13) $C_3H_8 \text{ cracking} = C_3H_6 + H_2$
(14) $C_3H_8 \text{ cracking} = C_2H_4 + CH_4$
(15) $C_2H_4 \text{ cracking} = 2C + 2H_2$
(16) $Fe_2O_3 + H_2 = 2FeO + H_2O$
(17) $FeO + H_2 = Fe + H_2O$ Oxidation reactions are indicated by Equations 1, 2, 9, 10, 11, and 12. Equations 16 and 17 are typical of reduction of a metal oxide; exothermic reactions are indicated by Equations 1, 2, 3, 6, 7, 8, 10, and 12, whereas endothermic Equations 4, 5, and 11 are typical of reforming reactions.

In present practice, so far as I am aware, when exothermic reactions are promoted difficulty is experienced in keeping the temperature in the reaction zone within desired limits; the tendency is for the temperature to rise unduly or for the stream containing reaction products to leave the reactor at a high temperature. Some exothermic reactions must be conducted within a narrow range of temperatures for most satisfactory results. As an example, in the reactions of CO with $H_2$ in the production of motor fuel, in ordinary practice extreme care is commonly used to provide much cooling surface (water-filled tubes) to conduct heat from the catalyst, and even under these conditions the surfaces of the finely-divided catalyst becomes overheated. It is possible in the practice of the present invention to so limit the intimacy of contact, time of contact, and amount of catalyst contacting the stream initially containing reactants (CO and $H_2$) that the deposition of wax and carbon on the catalyst surface is reduced to a minimum and overheating of the catalyst minimized.

Figure 1 shows diagrammatically in elevation, but substantially as a flow diagram, one form of apparatus in which the process of this invention can be practiced.

In the practice of this invention, with reference to Figure 1, some of the distinguishing or characteristic features are: Fine and/or small-size particles are fluidized in chamber 1 while an appreciable depth of the fluidized mass is confined in the interstices of a bed of much larger, non-fluidized solids. The latter solids are usually stationary during process operation but they can be caused to move downwardly under control and out of the chamber at a low zone as through 37 and 38 when desired. Another feature believed to be new is the circulation of small-size solids through the bed of non-fluidized solids while the former solids are in the fluidized or vibrating state. This combination, the circulation and the limitation of the degree of freedom of the small-size particles to ebullient motion, makes possible the maintenance of a hot zone in a chosen portion of the fluidized and non-fluidized beds. In my Patent No. 2,503,291, referred to above, means of regulating the temperature in a mass of fluidized small-size solids was shown and means of introducing reactant material and/or cooling fluid at different zones in the reaction chamber were shown; these procedures can be employed in conjunction with the apparatus shown in Figures 1 and 3, and novel effects can be obtained. In Figure 1, promoting exothermic reactions which require considerable dissipation of heat, the present invention accomplishes the cooling effect and temperature control by the downward circulation of catalyst or other fine size heat exchangers, removes them from the reaction chamber as through 8, and cools them by a cooling medium introduced through 11 and 12, and then circulates the small-size solids back into the reaction chamber 1 through 9, 10, and 13 or through 9, 42, 41, 43, and 46. Internal cooling can also be practiced, that is, cooling within the reaction chamber by a coolant as described in said Patent No. 2,503,291.

In Figure 1, the reaction chamber 1 is substantially filled with sized packing material, shown as spheres 2, supported on a porous support 3 and has a supply line 4 with control valve 5 for introducing a stream containing reactant material and an offtake conduit 6 for said stream and control valve 7 adjacent the top thereof. Means for circulating finely-divided solids are shown by connected conduits 8, 9, and 10 with control valve 13 and with injector 11 and its control valve 12 for introducing a propellant fluid, such as steam, gas, vapor, or a volatilizable liquid. This is an auxiliary propellant means when the reactant fluid stream from 4 and through 5 is not used for the purpose. Supply reservoir 14 for finely-divided catalyst or finely-divided heat exchange solids, or for both, is connected with the reaction chamber by conduit 15 which has a supply-control valve 16. A pressure equalizing line 17 with valve 18 connects the reservoir 14 with the inlet conduit for reactant fluid 4. Conduit 19 with control valve 20 is adapted to supply steam to chamber 1 and conduit 22 with control valve 23 is adapted for supplying oxygen or a gas containing free oxygen to 1 through bustle pipe 21. Port 25 is for igniting gas-air mixtures in starting operations. Air is supplied through conduit 26, valve 27 and valve 5. Thermocouples with suitable wire connections for recording temperatures are indicated by 28, 29, 30, and 31 whereas conduit 33 with control valve 34 are for introducing an auxiliary gas supply which may be hydrocarbons. Means for removing circulated small-size solids are provided by valve 36 and conduit 35 and they are used when more solids are circulated than it is desirable to recirculate through 8, 9, and 10, or through 8, 9, 10, 41, and 46; offtake conduit 37 with control valve 38 is for withdrawing the large-size solids whereas means for withdrawing fluidized solids from the top of the fluidized bed are provided by conduit 39 and valve 40. Means for recirculating fine-size or small-size solids without an appreciable carry-over of reactant or circulating propellant fluid into the fluid stream discharging through 6 and 7 are shown by valve 42 in conduit 41 leading to secondary reservoir 43; the excess gas carried into reservoir 43 may be discharged through conduit 44 and valve 45, and valve 46 controls the return supply of the said recirculating solids. Valve 47 controls the supply of stripping fluid which is introduced into reservoir 43 and this fluid may be steam or other chosen fluid.

Figure 2:
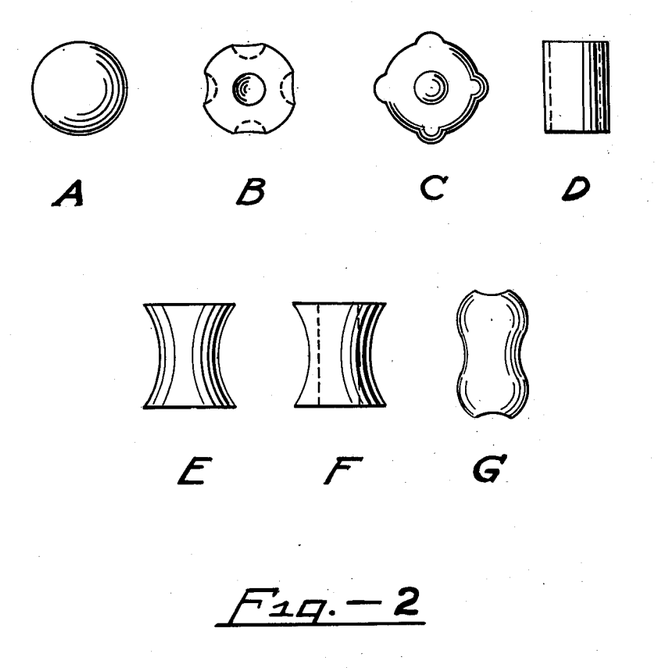
Figure 2 shows in elevation some of the types of the non-fluidized, large-size solids used or usable for packing a reaction chamber, such as (1) of Figure 1; they are designated A, B, C, D, E, F, and G.
Figure 3:
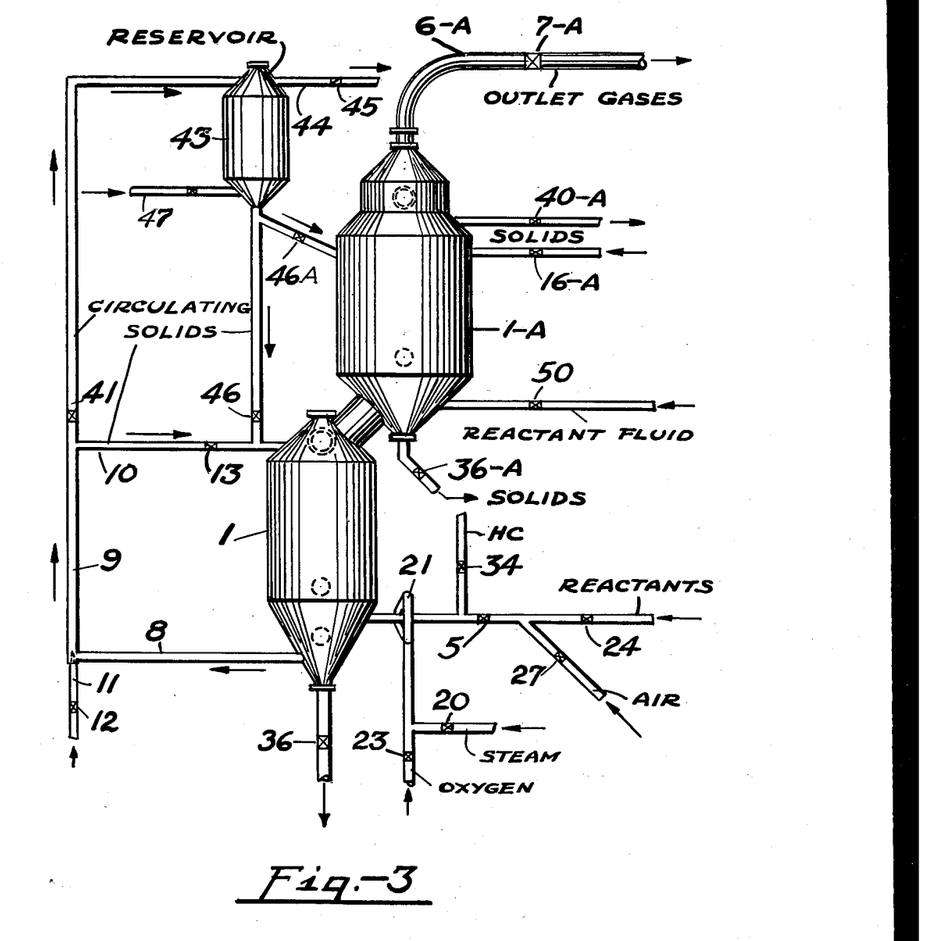
Figure 3 shows diagrammatically in elevation, but substantially as a flow diagram, a modification of the apparatus shown in Figure 1, employing two reaction chambers, which provides means for introducing any reactant fluid or mixture of fluids, at a zone which is equivalent to a middle zone of a single chamber apparatus, through valve 50. Also, means are shown for withdrawing small-size solids from the latter zone through 36-A.

In Figure 2, A is a sphere, B is a sphere with regularly placed depressions in its surface, C is a sphere with regularly placed protrusions on its surface, D is a hollow cylinder, and E, F, and G are typical of other irregular shapes that are useful fillers or packing for chambers 1 of Figures 1 and 3. Many other different shapes and sizes may be used.

In Figure 3, the same general numbering system is applied as in Figure 1. However, the use of a plurality of reaction chambers directly connected requires additional numbering as follows: The upper chamber is numbered 1-A, the supply line of small or fine-size solids from reservoir 14 (shown in Figure 1 but omitted here for simplicity) has control valve 16-A, whereas the outlet conduit for fine-size solids at the top of 1-A has control valve 40-A. The control valve for the discharge of circulating small-size solids from the bottom of chamber 1-A has control valve 36-A whereas the feed line for circulating solids from reservoir 43 to 1-A has control valve 46-A. In this apparatus the major offtake means for the gaseous fluidizing stream and gaseous or vaporous stream of reaction products is at the top of 1-A, namely, 6-A and 7-A. Provision is made for introducing a coolant or other temperature-control fluid or reactant fluid at substantially the bottom of 1-A and the conduit for this purpose has a control valve 50. According to the specific effect desired, the latter valve may be the control for the supply of steam, air, oxygen, combustible gas, combinations of them, or other fluid. The other numbers refer to the same parts as in Figure 1.

In the operation of the apparatus shown in Figure 1, the solids, shown at 2 as spheres, may be of different shape, the major factor being the selection of these solids which, when they are packed or placed in a reaction chamber as a bed, provide a large number of small channels in the bed whereby a fluid flowing through said bed passes by a torturous path through the interstitial space. Thus, spheres with holes through them or with a plurality of dents in, or protrusions on, them may be used; twisted, bent, or otherwise formed materials may be used but they should be substantially uniform in size among themselves in any particular layer, although it is sometimes desirable to use smaller sizes in top, bottom, or both zones than in the middle zone. They should be so selected that finely-divided solids can be fluidized in the interstitial space of said bed by passing a fluid stream upwardly therethrough. The composition of the packed solids may vary according to the reactions to be promoted in the bed. All or some of these solids may be catalytic to particular reactions or they may be catalytically inactive; they may be good or poor conductors of heat according to the effect desired; they may be molded or otherwise specially prepared to suit a particular use and they can be crushed and substantially uniformly sized natural mineral matter. Examples of materials which may be used include reduced nickel and/or cobalt with or without a promoter, such as copper or manganese, preferably prepared with alumina, silica kieselguhr, magnesia, or the like, the final product being heat-treated usually and reduced with hydrogen before use. Another example is the well known brown oxide catalyst composed chiefly of iron oxide with some chromium oxide and a small amount of an alkaline compound such as potassium carbonate. Other catalyst known in the art may be used. Solids, such as crushed quartz, silicon, obsidian, or certain other mineral matter may be used, and prepared solids comprising $Cr_2O_3$, $Fe_2O_3$, $FeO$, $MuO_2$, $Ni$, $Co$, $Fe$, or $Cr$, or other oxides, metals, and silicates, may be employed or combinations of them, each being selected with consideration to the reactants to be promoted and/or the temperature selected for promoting said reactions. The selected solids must not fuse or become plastic at the temperature of operation found to be optimum for a particular reaction.

Referring to Figure 1, and considering operation in one of its simple forms, reference is made to Equations 11 and 12 for the production of reformed gas in the following example:

EXAMPLE 1

*Reforming methane, employing oxygen and steam to react therewith in substantially continuous operation*

The nonfluidized solids 2 in this example may be substantially spheres made of nickel-cobalt catalyst adapted to catalyze the reforming of hydrocarbons with steam. The top and bottom zones of the bed of these solids may be quartz, fused iron oxide catalyst, or other substance. The size of these solids (spheres) in this example is ¾ inch (0.75 inch) in diameter. The total depth of the bed of spheres is ten feet, although it could be greater. Starting with all valves closed, proceed as follows: Open offtake valve 7, open valves 5 and 24 slightly, open air valve 27, and ignite the gas-air mixture in 1 through port 25. Close port 25 and continue the combustion for a spell with the lower portion of the bed of spheres at a high temperature, above 1650° F. and preferably above 1850° F. The air valve 27 is now closed and also gas valve 5, and steam is introduced by opening valve 20. After a brief period, it will be found that the hot zone has traveled up to a higher zone in the bed but the temperature is still high, being substantially the same as at the start of the steaming period, namely, above said 1650° or 1850° F. Now steam, oxygen, and methane are passed into 1, valves 20, 23, 24, and 5 being open. The proportions are approximately as shown by Equation 12. According to the latter equation, the gas made would have a composition as follows:

|  | Per cent by volume |
|---|---|
| $CO_2$ | 5.1 |
| $CO$ | 25.4 |
| $H_2$ | 69.5 |
|  | 100.0 | and the swell or increase in volume, comparing the volume of dry gas made with that of the methane used, would be 3.3. Actually, the composition of the dry gas made in experimental tests was as follows:

|  | Per cent by volume |
|---|---|
| $CO_2$ | 5.0 |
| $CO$ | 25.5 |
| $H_2$ | 68.4 |
| $CH_4$ | 0.8 |
| $N_2$ | 0.3 |
|  | 100.0 |

The swell was 3.4 and the volume of steam added was somewhat in excess of that indicated by Equation 12. The actual proportions of materials used in the tests were:

| Methane gas | cubic feet | 1000 |
|---|---|---|
| Oxygen | do | 442 |
| Steam | pounds | 16 |

As thus described, this invention is not yet in full operation; proceeding as outlined, the temperature will rise and the hot zone will travel upwardly until the top zone of the bed of spheres is hot and the gas made along with the excess steam passes out of the top of said bed at a high temperature. The temperature of the hot zone, in the upper portion of the bed, now decreases, appreciable heat is lost from the system as sensible heat of the gas, the $CO_2$ and $CH_4$ content of the gas made increases, and the conversion of $CH_4$ decreases, and more oxygen is required to keep the process operating.

In order to avoid this difficulty, finely-divided solids are introduced into the bed of spheres. The fine solids are so small that they flow into and collectively fill much of the interstitial space in said bed and are fluidized or at least kept in vibrating turbulent but limited motion in said space partly by the flow of the reactant stream upwardly through said bed and partly by virtue of the removal of the fine solids at a predetermined rate from a low zone or from the bottom of said bed. To accomplish this, the fine size solids, having an average mean diameter equivalent to about 200 mesh, or less, in this example, are introduced into reaction chamber 1 by opening valve 16. After the bed is so filled that the fine solids form a layer above the spheres, valve 16 is closed and valve 13 is opened allowing the fine-size solids to recirculate, being removed from the bottom of 1, passing through 8, 9, and 10 and valve 13 by the force of the reactant stream, or by the force of a fluid (steam preferred) injected through 11 by opening valve 12.

The amount of solids circulated preferably is sufficient to keep the temperature in the top zone of the bed of spheres low, preferably below 300° C., and valves 13 and 12 may be used to control circulation rate. In this manner the heat normally lost as sensible heat of the gas made is returned to the hot zone and thereby a hot zone is maintained in substantially a middle portion of said bed of spheres. Preheating of the methane or oxygen is not desired beyond that required to prevent steam condensation adjacent the pervious or porous bottom 3; the solids circulating down from the hot zone are cooled by the incoming methane, oxygen, and steam, and impart heat to them. By observing the temperatures indicated by thermocouples 28, 29, 30, and 31 and regulating the rate of recirculation of solids and/or the velocity of the reactants and the amount of oxygen supplied through valve 23, it is possible to keep the hot zone at a desired level and temperature. If the temperature rises in the hot zone above the preferred or desired point, more methane and steam may be used or less oxygen. If the hot zone tends to travel downward in the bed, the rate of circulation of the fine-size solids is too high. Although the temperature preferred depends on the quality of gas desired and on the activity of the catalyst, it is usually preferable to maintain temperatures in the hot zone in the range 1650° to 2200° F. For satisfactorily reforming hydrocarbons of low molecular weight, superatmospheric pressure is not required and, therefore, the operation described can be conducted at convenient pressures; in Example 1 the pressure used was sufficient to maintain the conditions described and push the gas through the system against a back pressure of less than 1 lb./sq. in. gauge.

Attention is called to the fact that the reaction expressed by Equation 12 is not self-sustaining when the stream containing the make gases leaves the reaction chamber at temperatures above about 600° F. to 700° F., whereas when a sufficient amount of solids are circulated, as described, to keep the outlet-gas temperature below about 540° F., the amounts of oxygen and steam used per unit volume of methane reformed can be reduced almost to the proportions shown by Equation 11. A definite economy is made by the circulation of the fine-size solids.

In Example 1 the spheres used in the middle zone of the bed were of catalytic material but they need not be of such when the temperature in the hot zone is kept above about 1800° F. Refractory materials and certain metals and metal-coated solids adapted to withstand exposure to high temperatures and adapted to resist abrasion may be used. It will be understood, of course, that the fine-size solids recirculated could be catalytic or other material. Again, when a very cheap finely-divided material is used as the downwardly flowing (circulating) medium, it may, under some conditions, be more economical or desirable to pass it through reaction chamber 1 only once, discarding it from the process thereafter. My experiments show that an appreciably deeper hot zone is maintainable when at least some of the fine-size solids are catalytic to the reforming reactions and when the spheres or other solids comprising the stationary bed are not specially prepared catalyst but rather are prepared mineral solids.

EXAMPLE 2

*The production of carbon black by the conversion of CO to C and $CO_2$ substantially in accordance with Equation 1*

This reaction is highly exothermic and readily responds to catalytic action. Because the $CO/CO_2$ equilibrium changes adversely with rising temperature, it is necessary for dissipation of heat substantially as generated. This is also essential for the production of a uniform grade of carbon black. In this example, the solids, or those in the reaction zone of the stationary bed, may be nickel or other solid but preferably not iron or a substance that is catalytic to the formation of carbon black. The finely-divided solids are preferably of iron or partly carbided iron or other catalyst. The procedure is substantially the same as described except that oxygen is not used and very little, if any, steam is used. The circulated iron catalyst is withdrawn hot and is cooled in passing through 9 and 10 by the introduction of a coolant through 11 and 12. The vapor or vaporized coolant passes through 13 and out with the reaction products. The temperature of the products leaving the stationary bed at the top thereof is preferably at a higher level than in Example 1. In this manner some of the heat of reaction passes out as sensible heat of the reaction products and the remainder of the excess heat passes out as sensible heat of the circulated solids. To accomplish this, it is necessary to maintain a large portion of the bed at a desired reaction temperature and it is also preferred that the intimacy of contact of the reactant stream be less than maximum and that the catalyst be not too highly reactive. The density of the fluidized solids, that is, the mass of the latter solids and the fluid, is less as the velocity of flow of said reactant fluid stream increases. Accordingly, a high linear velocity of the stream initially containing reactants is preferred above about 1 cubic foot per second measured at 60° F.

A gas having a composition as follows:

| | Per cent by volume |
|---|---|
| $CO_2$ | 6.0 |
| CO | 24.4 |
| $CH_4$ | 0.6 |
| $N_2$ | 69.0 |
| | 100.0 | was passed through a bed of stationary solids, as described, with a temperature in the hot zone of 360° to 450° C. and the outlet gas had a composition as follows:

| | Per cent by volume |
|---|---|
| $CO_2$ | 17.8 |
| CO | 4.9 |
| $CH_4$ | 0.7 |
| $N_2$ | 76.6 |
| | 100.0 |

The depth of the bed and mass of fluidized solids in this case was approximately four feet. The carbon recovered from the test was equivalent to 3.1 lbs./1000 cu. ft. of the raw gas treated. The gas treated in this example was introduced into chamber 1 through 24, 4, and 5. It will be understood that the solid reaction product, carbon in this case, which will be in the form of extremely fine light powder, will be entrained in the gases leaving from line 6.

EXAMPLE 3

*Heat treatment of gases employing fluidized solids as contact medium while maintaining a hot zone in a portion of the fluidized bed between the top and bottom thereof*

Commercially pure manufactured water gas or reformed hydrocarbon gas, particularly if made in the presence of coal, such as bituminous coal, contain impurities which are undesirable in the gas when used as raw material in the synthetic chemical industry. These impurities include one or more of the following: styrene, indene, cyclopentadiene, butadiene, hydrocyanic acid, organic sulphur compounds such as carbon bisulphide, thiophene, mercaptans, and others, carbon oxysulphide, oxides of nitrogen, and other substances. In treating such a gas, proceed, with reference to Figure 1, as follows: Prepare a hot zone in the middle portion of a substantially stationary bed of solids 2 of chamber 1, as in Example 1. Then pass the gas to be treated through 24, 4, and 5, and simultaneously admit some steam and a very small amount of oxygen by opening valves 20 and 23. Now watch the temperature indicated by thermostats with couples at 28, 29, 30, and 31. Use sufficient oxygen to maintain the hot zone at 1800° to, say, 2200° F. in the region of couple 30. Finely-divided solids for the purpose of heat exchange are caused to pass downwardly through the stationary bed of solids while they are substantially in a fluidized state and are recirculated as described through 8, 9, 10, and 13. Cooling of the circulating solids outside of chamber 1 is not necessary in this instance. A raw water gas having the composition given below is passed through the reaction chamber 1 substantially as described.

COMPOSITION OF RAW WATER GAS

|  | Per cent by weight |
|---|---|
| $CO_2$ | 4.0 |
| CO | 38.2 |
| Illuminants | 0.5 |
| $H_2$ | 50.8 |
| $CH_4$ | 2.8 |
| $N_2$ | 3.7 |
|  | 100.0 |

The fine-size solids are circulated at a rate whereby the outlet stream of reaction products is at a temperature below about 300° C. Only a small amount of oxygen need be used because very little heat is required, chiefly that used to make up for heat losses and radiation. With a well insulated reaction chamber, about 2 per cent of oxygen should be sufficient to maintain the desired operating conditions. The yield of gas from 1000 cubic feet of the water gas treated is in the neighborhood of 1050 cubic feet. The composition of the outlet or treated gas will ordinarily be approximately as follows:

|  | Per cent by volume |
|---|---|
| $CO_2$ | 4.8 |
| CO | 38.6 |
| Illuminants | 0.0 |
| $H_2$ | 52.3 |
| $CH_4$ | 0.7 |
| $N_2$ | 3.6 |
|  | 100.0 |

The gum-forming hydrocarbons are completely eliminated, and organic sulphur is converted to $H_2S$. Oxides of nitrogen were not present in one gas so treated although there was some NO present in the gas before treatment. The gum-forming unsaturated hydrocarbon compounds which are usually included as illuminants in ordinary gas analysis will usually be present in small amounts in the untreated gas but will be absent from the treated gas.

The amount of steam used may vary over appreciable limits but it is desirable to use more steam when the organic sulphur is present in appreciable amounts or when the per cent of hydrocarbons present is relatively high than when these substances are present in the raw gas in small amounts only. Preferably the amount of steam used should be about 3 lbs. or more per 1000 cubic feet of raw water gas treated. With appreciably more hydrocarbon material present than in the gas used in this example, the amount of steam used may be 10 lbs. or more per 1000 cubic feet of gas to be treated.

It will be noted that in this method of treating gas the only appreciable loss is the cost of the steam; it does not leave the reaction chamber at a high temperature.

In the event that the percentage amounts of hydrocarbon in the gas and steam used are appreciable with respect to the volume of raw gas to be treated, the amount of oxygen required to maintain the chosen operating temperature in the hot zone may be greater than in the case of this example; this is true because of the endothermic nature of the reactions of steam with hydrocarbons.

Before citing another example, attention is called to the fact that in treating gases for the elimination of stenches the general procedure of Example 3 may be effectively followed. In the event that the stench gas does not contain sufficient combustible matter to support combustion, it is only necessary to supply it. Referring to Figure 1, pass the stench gas in continuously through 24, 4, and 5, and admit combustible gas through 33 and 34, and, if there is insufficient oxygen in the said stench gas to support complete combustion of the added combustible gas, admit air through 26 and 27. Less than 10 cubic feet of natural gas and less than 110 cubic feet of air are normally required for this operation.

EXAMPLE 4-A

*Treatment of waste gases containing appreciable amounts of sulphur compounds such as $H_2S$, COS, $CS_2$, $SO_2$, RSH, $R_2S$, and the like*

This is a special case, because the recirculated finely-divided solids may be reactant material, such as carbon, reactive coke, or other highly carbonaceous or carbon-containing solid. Thus, in this example the circulated solids are not only a heat-exchange medium but they may enter endothermic reactions and thus further function as a means of controlling the temperature in the reaction chamber. Sulphur may be recovered from the treated gases.

Some of the reactions with which one is interested in this example are those shown in Equations 18 to 31, inclusive.

(18) $H_2S + 1.5O_2 = H_2O + SO_2 + 246,060$ B. t. u.
(19) $H_2S + 0.5O_2 = H_2O + S + 118,120$ B. t. u.
(20) $2H_2S + SO_2 = 2H_2O + 3S + 108,300$ B. t. u.
(21) $2CO + S_2 = 2COS - 30,800$ B. t. u.
(22) $C + S_2 = CS_2 - 49,500$ B. t. u.
(23) $C + H_2O = CO + H_2 - 72,680$ B. t. u.
(24) $C + 2H_2O = CO_2 + 2H_2 - 73,490$ B. t. u.
(25) $C + CO_2 = 2CO - 71,860$ B. t. u.
(26) $CS_2 + 2H_2O = CO_2 + 2H_2S - 13,910$ B. t. u.
(27) $3S + 2H_2O = 2H_2S + SO_2 - 108,300$ B. t. u.
(28) $COS + 0.5O_2 = CO_2 + S + 106,960$ B. t. u.
(29) $COS + 1.5O_2 = CO_2 + SO_2 + 234,900$ B. t. u.
(30) $SO_2 + C = CO_2 + S + 44,860$ B. t. u.
(31) $COS + H_2O = CO_2 + H_2S - 11,160$ B. t. u.

Although $H_2S$ can be burned in almost any kind of a furnace to produce $SO_2$, the direct oxidation of $H_2S$ to S, as indicated by Equation 19 requires temperature control, the reaction being strongly exothermic. The use of a catalyst and moderately high temperatures may be desired, depending on concentration of the $H_2S$. Catalysts for this reaction which are well known are iron oxide, carbon, and alumina. Clay is also catalytic and otherwise a beneficial contact medium in promoting the latter reaction. The oxygen used in Equation 19 is preferably supplied as air.

Referring to Figure 1, the stream containing the reactant material, $H_2S$, is introduced through 24, 4, and 5 as in previous examples, and air is introduced through 26 and 27 as before under control, and a hot zone is established. The sulphur formed as a product of reaction is removed in the vapor phase through 6 and 7. Normally, when the gas thus oxidized contains a very appreciable amount of $H_2S$, say 30% or more, the temperature rises undesirably in a fixed bed and endothermic reactions, such as shown in Equation 27, tend to occur in the upper portion of the bed. By circulating finely-divided solids downwardly through the bed of relatively large-size solids, as described, the temperature in the hot zone can be controlled. When the circulated solids comprise carbon, the carbon acts not only as a carrier of heat but in the hot zone it reacts with steam (added steam or that generated by Reaction 19) to form water gas by endothermic reactions. This eliminates, or appreciably reduces, the tendency for Equation 27 to occur. The circulated solids may be a mixture of carbon and another substance such as clay. The sulphur in the outlet gas stream may be recovered by known methods. The temperature in the hot zone of reaction chamber I for production of sulphur is preferably not higher than about 1800° F. The use of steam to keep the temperature down, by opening valve 27, tends to promote Reaction 27 unless carbon is used in the circulating fluid or unless some other endothermic reaction is promoted which consumes steam. In this example (4A) the circulating solids may be drawn off at any temperature above 60° F. found to be advantageous in maintaining the chosen temperature. When they are drawn off hot, they should be cooled before again circulating them in the reaction chamber. The sulphur may be recovered by known means from the gases.

Another reaction involving sulphur compounds but which is endothermic might be considered here as:

EXAMPLE 4-B

*The production of $CS_2$ from carbon and sulphur or from carbon and a compound of sulphur which is caused to liberate sulphur substantially as described*

Carbon combines with sulphur as indicated by Equation 22 to form $CS_2$ with the absorption of heat equivalent to 49,500 B. t. u. per 76 pounds of $CS_2$ formed. The reaction is conducted most satisfactorily at high temperatures, above 2000° F. It is found that best results are obtained when heat is conserved as fully as possible by the circulation of carbon in a dense mass down through the interstitial space in the reaction chamber. Starting with a gas rich in $H_2S$ the heat for promoting Reaction 22 may be generated by combustion of part of the $H_2S$ as by Reactions 18 and 19. The sulphur thus formed combines with the carbon to form $CS_2$ and the $SO_2$ formed reacts at lower temperatures exothermically according to Equation 30. The overall reaction for $SO_2$ with carbon may be written (31) $2SO_2 + 3C = 2CO_2 + CS_2 + 40,190$ B. t. u.

and the approximate overall reaction including the oxygen for exothermic reaction with $H_2S$ may be written as follows:

(32)
$20H_2S + 6O_2 + 21C = 10CO + CO_2 +$
$10CS_2 + 20H_2 + 81,160$ B. t. u.

In conducting the operation, and referring to Figure 1, proceed as described only add the $H_2S$ and oxygen, or oxygen-containing gas such as air, by opening valves 27, 24, and 5, after a hot zone has been established in the mass of placed solids in I. Initially the proportions of $O_2$ and $H_2S$ are substantially as shown by Equation 32. Because of the difference in reactivity of different carbons it may be necessary to adjust the relative amount of $O_2$ used for the purpose of maintaining the desired high temperature in the hot zone and for producing optimum amounts of $CS_2$ which is determined by test. In tests made by the inventor the temperature desired in the hot zone was found to be 2000° to 2350° F. The circulating solids were finely-divided carbon and the rate of circulation was sufficient to keep the top of the bed of stationary solids relatively cool and to preheat the entering reactant stream. The outgoing gas will have a volumetric composition approximating the following if $O_2$ instead of air is used.

| | Per cent |
|---|---|
| $CO_2$ | 2.4 |
| CO | 24.4 |
| $CS_2$ | 24.4 |
| $H_2$ | 48.4 |
| | 100.0 |

The gas made, after removing the $CS_2$ and impurities, is useful for other purposes. When sulphur vapor is supplied as the raw material the basic reaction of interest is that shown by Equation 22. Again high temperatures in the hot zone are required and sufficient combustion must be promoted to yield the necessary heat of reaction plus a small amount to care for heat losses. For every 12 pounds of carbon reacted as in Equation 22, approximately 1 pound of carbon must be burned to supply the necessary heat. Other similar reactions can be promoted by controlling the temperature in the reaction zone, the nature of the catalyst used, the depth of bed of solids in the reaction chamber, rate of flow of the reactant stream through the hot zone, the concentration of reactant material initially present in said stream, rate of circulation of fine-size solids, the pressure in the system and other variables.

In most of the examples thus far presented rather high temperatures were required, hence it seems desirable to present one case in which relatively low temperatures are employed.

EXAMPLE 5

Desulphurization of gases

In present practice, in removing organic sulphur from gas containing the latter, the gas to be treated is preheated to about 480° to 570° F. and mixed with about 0.5 to 1.0% of oxygen or equivalent air and then passed through a stationary bed of pelleted catalyst comprising usually about 70% of iron oxide (ferric oxide) and about 30% of normal sodium carbonate ($Na_2CO_3$). The sulphur initially present in the gas as sulphur compounds is oxidized by this treatment and forms by reaction with the $Na_2CO_3$ the sulphate ($Na_2SO_4$); the oxidation reactions are exothermic. A heat exchanger is not required when the reactions are promoted in a fluidized or a vibrating mass of small-size particles of catalyst in which temperature zones can be established as described. The heat of reaction thus can be most effectively utilized by circulating small-size particles downwardly substantially as described.

Referring to Figure 1, the operation may be carried out as follows: Prepare a hot zone in substantially the middle of the bed of stationary solids in a manner as described. Then introduce the gas containing organic sulphur impurities by opening valves 24 and 5. Introduce oxygen by opening valve 23, so that a controlled small amount of it is mixed with the gas to be treated. If the gas is dry it is particularly desirable to introduce a small amount of steam in a similar manner by opening valve 20. The products of reaction are removed through 6 and 7.

The operation is now under way except for the circulation of the finely-divided solids which, in this example, are catalytic to the reaction and which may be alkalized iron oxide, namely, ferric oxide, which is alkaline in reaction due to the presence of an alkali or alkaline carbonate, preferably $Na_2CO_3$ or $MgCO_3$, or a combination of $NA_2CO_3$ and $MgCO_3$. The actual amount of heat generated per 1000 cubic feet of gas treated is small, and the amount of circulation of the catalyst down through the stationary bed may be small, but it is usually necessary to conserve the heat of reaction and remove the gases at as low a temperature as feasible. In the event that the amount of sulphur present in the gas to be treated is so small that difficulty is experienced in maintaining the desired operating temperature of 480° to 570° F., a very small amount of reactive carbon of low ignition temperature can be circulated with the catalyst. Combustion occurs to the extent of the oxygen available to support combustion.

In carrying out this feature of this invention a unique condition arises, namely, the carbon stays in an upper layer and the iron oxide catalyst remains in a lower layer. The height of the line of demarkation can be controlled by limiting the amount of the carbon. In other words, the carbon does not pass down with the oxide but remains on top of the fluidized mass. The oxide, in passing through the carbon layer, becomes heated and this heat is, or may be, used in maintaining the operating temperature in the reaction zone. This feature is an important part of this invention and hence, it is desirable that it be clearly explained. A double layer of finely-divided solids can be maintained, the particles of each layer being in a state of agitation simulating a fluidized mass. Meanwhile, the solids which comprise the lower layer can be withdrawn at a chosen rate and replaced by the addition of a similar amount of the same kind of solids added adjacent the top of the bed, and the plane of separation of the layers remains substantially stationary, the general effect being that the heavy particles (iron oxide catalyst in this instance) pass down through the upper layer; the upper layer remains like a layer of water on oil. This permits the generation of heat within the bed at a zone adjacent the major reaction zone in such a manner that the generated heat is available in the reaction zone by virtue of the travel of the heavy particles of catalyst through the upper layer. It is believed that this feature is new in the art and it is understood to be applicable to other reactions than the one described in this example.

The bottom layer of the fine-size vibrating particles is comprised of particles that have circulated down from the top. To increase the depth of the lower layer it only is necessary to feed the particles of which the lower layer is comprised at a faster rate than the rate they are withdrawn from below and vice versa. When a deeper upper bed is desired, more of the solids of which the upper layer is comprised are supplied to the reaction chamber and less of the denser or larger size particles. The change in the relative depths of the layers can be made rapidly.

For the purpose of simplicity, two layers only have been discussed here, an upper and a lower layer, but, of course, more than two layers may be provided and sometimes they are highly desirable. For example, the bottom zone may comprise chiefly heat-transfer particles which absorb heat in the upper layers and transfer the absorbed heat to the incoming stream of reactant material; the next upper layer may comprise particles chosen for their catalytic action or adaptability to function as contact material in the hot zone (zone of primary reaction), and the top zone may comprise particles chosen because of their suitability for promoting secondary reactions conducted usually at lower temperatures. Cracking and subsequent polymerization is one such case. Cracking of hydrocarbons in the vapor phase and subsequent treatment for removal of gum-forming materials is another example.

In processes where it is desired to establish separate layers of finely-divided materials, a more distinct separation of the layers can be realized by suitably selecting the materials of the respective layers on the basis of their relative buoyancy in an upflowing stream of fluid. As indicated above, this buoyancy depends, among other factors, upon the density and the particle size of the material. When packing is employed, materials of substantially the same particle size but of different density can be separated. In like manner, materials of the same density but of substantially different particle size can be separated. Therefore, in selecting materials for the respective layers, these considerations should be kept in mind.

Hydrogen sulphide can be burned to sulphur in the presence of active carbon as catalyst by controlling the temperature of the carbon particles in the hot zone. The carbon and sulphur withdrawn can be treated for recovery of the sulphur. This procedure of $H_2S$ removal is continuous.

EXAMPLE 6

*Gasification of solid carbonaceous fuel in a substantially fine state of division*

This operation differs radically from the well known Winkler process wherein hot solid fuel particles, 3 to 10 mm. in size, are fluidized in a stream of mixed steam and oxygen and the reaction products, along with all of the ash and considerable carbon, pass out at a high temperature necessitating the use of an excessive amount of oxygen. In this example, the fuel particles are so limited in their motion in the reaction chamber that a hot zone can be and is established in a portion of the fuel bed below the top; the bottom portion of said bed is relatively cool.

Referring to Figure 1, the reaction chamber 1 is substantially filled with chosen highly refractory, suitably-sized solids which form a bed affording considerable interstitial space therein through which finely-divided solids can flow and in which space the latter solids can be substantially fluidized by the force of a fluid stream passing upwardly through said bed. A hot zone is established in the portion of said bed, substantially midway the top and bottom of said bed, as described. Now a mixture of steam and a gas containing free oxygen is admitted by opening valves 23 and 20. Valve 7 is open for the discharge of reaction products through 6. Finely-divided solid fuel of a size which can be kept in vibrant motion in the interstitial space of said bed is supplied from reservoir 14 through valve 16. The fuel thus added starts to move downwardly and, as it reaches the hot zone, the particles being in vibrant motion, it reacts with the steam and oxygen and is gasified, the resulting gas passing up through the interstices of the bed of fixed solids. If no other finely-divided solids are circulated or fed into 1 through 16, a rather deep hot zone will obtain rather than a thin zone and this makes possible gasification of a solid fuel without fusing the fuel ash. The oxygen and steam are so proportioned that the temperature in the reacting mass of vibrating particles is preferably in the range 1800° to 2100° F., although with some fuels higher temperatures may be employed. The hot zone may rise toward the top, drop to a zone near the bottom, or remain stationary according to the adjustment of feed supply and, particularly, the rate at which oxygen and steam are supplied to chamber 1. The higher the rate flow of said oxygen and steam, other factors remaining the same, the higher the temperature in the upper zone of the chamber. For high rates of gas making, it is preferable to maintain a double layer of finely-divided solids in 1 and some circulation is desirable of fine-size solids other than fuel. Finely-divided quartz or sand is satisfactory as a circulating medium and as the major component of the lower layer of finely-divided solids in the chamber. Preferably, the fuel charged should be somewhat finer (particles of lesser mean diameter than the particles of sand) than the sand, but when chromic oxide is used in place of sand, this may be of little importance. Sufficient circulation or recirculation of the heat-exchange solids (sand or quartz in this example) is desirable to absorb heat and provide a cooling effect on the stream of reaction products in the upper most zone of chamber 1 and to preheat the incoming reactants adjacent the bottom of said chamber.

In operating in accordance with this embodiment, the sand or other heat transfer material may be fed in from reservoir 43 until sufficient is built up in the system to provide a circulating stream, including the reactor and lines 8, 9 and 10. The oxygen and steam may be fed upwardly through the reactor at a rate suitable to permit the sand to pass downwardly through the bed, the coal or coke being maintained generally in the upper part of the bed. The hot zone should be established somewhat below the point of entry of the sand so that the latter can pick up heat from the products leaving the hot zone.

One satisfactory fuel for gasification in this manner is a reactive or low temperature coke. Other fuels may be used including lignite, sub-bituminous coal, partly oxidized coal, and anthracite. When anthracite coal is used higher temperatures may advantageously be used in the hot zone. In order to prevent the creation of excessively hot zones in chamber 1, the amount of steam used with oxygen is high, it should be greater than 3 volumes for 1 volume of oxygen, considering steam having a volume of 20 cubic feet per pound. With most fuels the ratio desired is appreciably over 4 volumes of steam to one of oxygen.

Inasmuch as the amount of circulation of the fine sand in this example is not great, all of it or a part of it may be withdrawn as through 35 and 36. Under some conditions, it is found ash particles adhere to the sand particles and are removed along with the sand; under these conditions, it is well to discard without recirculation at least a portion of the sand after it has passed down through the bed. Some of the ash is blown over entrained in the gas stream and some of it is removed with, but not adhering to, the sand particles. What happens to the ash particles is a function of the density of the circulating medium (in this example, sand) the velocity of flow of the stream initially containing reactants and the density of the ash particles as well as the ash-softening temperature.

In making producer gas, air and steam may be used as the gas-making fluids. The gas made with oxygen and steam in Example 6 will usually have a composition substantially as follows:

|  | Volume per cent |
|---|---|
| $CO_2$ | 14.2 |
| $CO$ | 39.8 |
| $H_2$ | 44.0 |
| $CH_4$ | 1.8 |
| $N_2$ | 0.2 |
|  | 100.0 |

The materials required per 1000 cubic feet of gas made, using a low-temperature coke as gas-making fuel are:

| Coke | pounds | 20 |
|---|---|---|
| Oxygen | cubic feet | 140 |
| Steam | pounds | 26 |

Example 6 has been described with reference to pressures (operating pressures) in the reaction chamber slightly above atmospheric pressure. It may be noted that at increased pressures methane forms in increasing amounts, provided an appreciable upper layer is maintained in the bed of vibrating, fine-size solids (fuel) which is only moderately hot. The production of $CH_4$ by reaction of CO with $H_2$ at superatmospheric pressure is, itself, not new, but this method of promoting the reactions is believed to be new and economical in performance.

Under conditions where the fuel ash has a softening point close to the temperature range desired in the hot zone, it is sometimes helpful to circulate a finely-divided material which would form with said ash, when fused together, a product having a higher softening temperature than said ash. Sand is such a product for some fuels whereas lime (CaO) functions in this manner for others. Limestone also may be used; it is noted that it evolves $CO_2$ forming CaO at a temperature above about 1515° F., and this hydrates at temperatures below 1000° F.

EXAMPLE 7

*Synthesis of hydrocarbons from carbon monoxide and hydrogen*

The synthesis of hydrocarbons and/or oxygenated organic compounds from hydrogen and carbon monoxide is carried out by passing carbon monoxide and hydrogen, together with some carbon dioxide and/or steam, if desired, over a suitable catalyst, such as a metal of the iron group, particularly iron, at temperatures between about 350° and 750° F. and under pressures in the range of 100 to 1000 lbs./sq. in. The reaction is highly exothermic. This requires the provision of some cooling means in the reaction zone, this means ordinarily assuming the form of cooling coils or tubes through which a cooling medium is circulated.

According to the present invention, this process is improved by utilizing as a catalyst relatively large lumps of any of the forms heretofore mentioned of catalytic material, such as iron or other metal of the iron group promoted, if desired, by alkali metal compounds, such as potassium fluoride, potassium carbonate, and the like. These large lumps of catalyst are employed in the form of a stationary bed through which is circulated in either direction finely-divided solid material of a character suitable for fluidization within the interstices of the bed of lumpy catalyst. This finely-divided material is preferably a material having a high heat capacity, such as sand, certain types of clay, silica gel or other gels, and the like. This finely-divided material is preferably introduced into the reaction zone near the upper end of the stationary bed and allowed to flow downwardly therethrough countercurrent to an upwardly flowing stream of reaction gases. Referring to Figure 1, this finely-divided material is fed into the reactor through valve 13 and is withdrawn from the bottom thereof through line 8. A cooling liquid may be introduced through line 11 so as to take up heat from the finely-divided material. This liquid may be some of the condensed reaction product which, upon reintroduction into the upper end of the reaction zone, merely passes out overhead with the reaction product.

As previously indicated, by suitably adjusting the rate of circulation of the finely-divided material and the upward velocity of the reaction gases, a hot zone, maintained at reaction temperature, can be established at any desired level in the stationary bed or can be moved from one level to another at will. Moreover, the depth of this hot zone can be adjusted.

Assuming that the finely-divided material is sand, it enters the upper part of the stationary bed in a relatively cool condition. It picks up heat from the issuing reaction product and picks up additional heat from the reaction zone. By properly adjusting the temperature of the incoming sand and its volume, the temperature of the hot zone can be adequately controlled. The hot sand leaving the reaction zone gives up some heat to the incoming reaction gases and then leaves the vessel. While this sand is in the reaction zone it is kept in a jiggling condition in the interstices in the lumps of catalyst by the upflowing reaction gases. This agitation of the sand serves to scour the catalyst surfaces and keep them relatively free of carbonaceous deposits. The scouring action of the circulating fine material can be regulated by suitable selection of this material. If it be found that the material is so abrasive that it erodes the catalyst, a less abrasive material can be substituted. Mixtures of finely-divided materials selected to exert the particular abrading action desired can be employed. For example, mixtures of sand and silica gel, the latter being in substantially spherical form, can be utilized.

In order to avoid making an unduly long specification with an excessive number of examples, brief reference only is made hereinafter to a number of operations believed to come within the scope of this invention.

Floating and fluidizing, or substantially fluidizing, an absorbent, such as clay, kaolin, active carbon, or other absorbent or adsorbent material on top of another body of similarly vibrating small-size solids in a confined packed column, meanwhile passing a vapor-phase fluid stream containing hydrocarbon reactant material with or without another reactant, such as oxygen, upwardly through both bodies, causing chemical reaction to occur in the stream of reactant material while passing through the lower body, and causing a cleansing but different chemical reaction to occur in the said stream as it passes through the upper body, withdrawing the stream and recovering at least one valuable reaction product therefrom, meanwhile maintaining chosen temperatures in each body, usually a higher temperature in the lower body, is believed to be new in the art.

Another operation is the separation of pyrite and other heavy or dense particles of foreign matter from crushed or finely-divided coal. The coal is fluidized in a packed column, the pyrite and dense particles form a layer at the bottom and coal forms a layer on top; by charging the coal with the pyritic impurities in an upper zone continuously, or substantially so, and similarly removing pyrite from the bottom, cleaned coal can be removed from a layer somewhat above the coal-feed zone substantially continuously. This operation provides cleaner and more rapid separation than when the ebullient motion of the fluidized particles is not limited as by packing or other means. When the fluidizing stream is hot gases, products of combustion or the like, the coal can be dried or preheated while the sulphur content is being lowered and the ash-softening point thereby raised. This is an important part of the present invention.

In the production of carbon black by the incomplete combustion of natural gas or other hydrocarbon gas, employing air and hydrocarbon gas as the reactant fluid, with or without a diluent gas, high yields of carbon are obtainable when the exothermic reactions are promoted in a reaction chamber typified by Figure 1, and the recirculated solids may advantageously be iron. In this instance the solids fluidized should not be too fine because entrainment is undesirable; they may comprise chiefly $Al_2O_2$, or $SiO_2$ or Si, or other chosen solid material that will withstand high temperatures, and may be cracking catalysts other than iron.

The combination of reforming of hydrocarbon gases or vapors by reaction with steam or with steam and oxygen, simultaneously with the gasification of finely-divided carbonaceous solid fuel in a reaction chamber is also believed to be new in the art; the method of accomplishing this should be evident from the above examples.

Before defining my claims, it should be made clear that the separation of small-size particles having different density or different buoyancy in the fluidizing stream is not nearly as sharp when ebullient motion of said particles in a fluidized bed is not restrained and limited as when it is limited; this is one of the features of this invention.

When highly exothermic reactions are promoted in the practice of this invention, it is possible to decrease the rate of reaction so that the hot zone is deeper than normal, and the temperature rise on the surface of the catalyst is a minimum by using extra large-size nonfluidized solids in the reaction zone, substantially the middle zone of the reaction chamber, and correlating the rate of recirculation of the small-size solids with the rate of flow of the reactant material (fluidizing stream) so that the concentration of said small-size solids in the fluidized bed is low. Further means of preventing too much rise in the temperature of the catalyst is to employ somewhat less reactive catalyst and to recirculate some $CO_2$ or $H_2O$, preferably $H_2O$ or other inert gas.

It is understood that high pressures, high or low temperatures may be employed according to the reaction promoted, and that deep or normal depth of bed of fluidized solids may be used. It is, of course, obvious that the size of the small-size or fine-size particles must be small enough to pass through or be fluidized in the bed of substantially stationary solids.

It is believed that it is distinctly new in the art to maintain a hot zone in substantially the middle of a fluidized bed of small-size solids. Furthermore, it should be noted that the hot zone can be moved up or down in the fluidized bed very rapidly; up by reducing the recirculation of small-size solids; down by increasing the rate of circulation of small-size solids and also by decreasing the rate of flow of reactant material if its reaction is exothermic.

Lignite and sub-bituminous coal can be carbonized in the practice of this invention, and the tar recovered, inasmuch as the temperature in the upper zone of the reaction chamber is relatively low and that in a middle zone of the bed of substantially fixed solids in the reaction chamber may be as high as desired. Air alone may be used as fluidizing fluid in this case since steam is supplied from the fuel itself if it is circulated down into the hot zone at a high enough rate. It is desirable that the lignite or sub-bituminous coal be only as fine in size as necessary to flow down into the stationary solids.

With reference to Figure 3, it will be noted that, whereas the operations described above can all be conducted in the double chamber I and I-A as well as in the single reaction chamber of Figure 1, in addition ready means are afforded here for recirculating one kind of solids through a fluid stream in one zone and another kind through said stream in another zone. For example, in cracking hydrocarbons and immediately thereafter polymerizing reaction products, it is possible to do the cracking in chamber I in the presence of a cracking catalyst circulated through I or through both I-A and I, and to promote polymerization in chamber I-A in contact with a catalyst selected for the purpose and, either circulated or confined in I-A. Furthermore, the arrangement of the double reaction chambers of this figures provides ready means for introducing a fluid into the stream entering I-A from I whereby particular reactions may be promoted in I-A employing reaction products from I. When oxidation reactions are promoted in I-A, employing reaction products from I as raw material, the oxidizing fluid may readily be introduced into I-A through 50. In case temperature control only is desired in promoting any reaction, or reactions, in passing a fluid stream up through I and I-A, a temperature controlling medium may be introduced through valve 50. Provision is also made for circulation of fine-size solids through I only, or through I and I-A, or through I-A only.

One of the particular features of the apparatus of Figure 3 is its adaptability to the separation of finely divided minerals, one from the other in mixtures, or from gangue material. The separation depends upon a difference in the buoyancy of the particles of mixed materials to be treated in the fluidizing stream. Differences in velocity of flow of the stream in I and I-A can be provided by selection of relative diameters of these chambers and by the control of the volume of fluid material introduced through 50 to I-A. It is possible to separate a very buoyant material at the top of I-A removing it through 40-A, to remove a product of intermediate buoyancy from 36-A and to remove a product of least buoyancy from 36.

All of the reactions cited above and many others which can be conducted in the practice of this invention can be conducted under pressures greater or less than atmospheric pressure; the use of a particular pressure range for particular reactions is intended. High pressures, for example, do not favor the reaction of Equation 4 but they do favor Reactions 1, 6, 7, 8, certain cracking reactions, polymerization reactions, and certain synthesis reactions.

One procedure which may not be classed as promoting chemical reactions in view of present knowledge of the subject is the preferential absorption or adsorption of materials from a complex fluid stream by selected solids which solids may be of like composition or of different composition. In present practice, in the removal of certain vapors and/or gases from a fluid stream, it is common to use such materials as silica gel, alumina, activated alumina, kaolin, clay, activated carbon, infusorial earth, and the like, particularly in preferentially absorbing such products as $SO_2$, $H_2S$, low molecular weight hydrocarbons, moisture, and other materials from said stream. In accomplishing this it is usual practice to employ triple vessels, one in operation, one being steamed or heated and one being cooled, the process being intermittent. The procedure for thus treating a fluid stream in the present invention is continuous, the absorbent or adsorbent flows countercurrently downward as the fluid stream initially containing adsorbable material flows upwardly through one or more reaction vessels, such as 1 of Figure 1 or such as 1 and/or 1-A of Figure 3. Referring to Figure 1, and considering the removal of natural gasoline from natural gas, the gasoline being initially in the vapor phase in said gas, the procedure is as follows: Pass the gas stream initially containing said gasoline, preferably under superatmospheric pressure, continuously into chamber 1 through 24, 4, and valve 5 and up through the interstitial space of the bed of non-fluidized solids 2 and out through 6 and 7 substantially as described. Now pass a stream of substantially fluidized, fine-size solids, which solids are adapted to adsorb gasoline vapors, downwardly through chamber 1 through said interstitial space and remove it from below as through offtake 8. The solids thus removed are steamed by opening valve 12, as they are carried substantially continuously up through valve 9, valve 42 and conduit 41 to reservoir 43 and the evolved gasoline vapors are removed through 44 and 45. These vapors in this instance are not considered as waste gas but are condensed and recovered by known means. It is preferable not to introduce steam through 47 in this case in order that the solids may be cooled in 43 sufficient for recirculation. The particular method of cooling is not a part of this invention; it is shown in Serial No. 582,692, referred to above. With reference to Figure 3, the recovery of gasoline is as follows: the flow of the natural gas is through 24 and 5, up through 1 and 1-A and out through 6-A and 7-A. Fine-size adsorbent solids, activated carbon in this particular example, are passed as a stream from reservoir 43 through valve 46-A into 1-A and caused to pass down through 1-A and 1 as described, through offtake 8, conduit 9, valve 42, and conduit 41 back to reservoir 43. The carbon is steam-treated by opening valve 12 and also by opening valve 47 to the extent desired or required to expel the absorbed gasoline. In this case the solids freed from gasoline vapors in 43 return warm to chamber 1-A and should be cooled before further adsorption of gasoline vapor is effected. The cooling is effected by the gas stream itself passing through 1-A or by the addition of a cooling fluid through inlet 50 or by both. Thus, the solids are cooled in 1-A, adsorb gasoline vapors in 1 and are heated during recirculation for the desorption of said vapors. The gas stream gives up gasoline vapors to the adsorbent solids in 1, and the residue gas stream aids in cooling the solids from 46-A in chamber 1-A before passing out through 6-A and 7-A.

Referring to Figure 3, it will be noted that the large-size non-fluidized solids are supported in the chambers 1 and 1-A and that in the space above the latter solids in 1 and beneath the fixed solids in 1-A the fluidized solids of fine-size may be free to ebullient or fluidized motion. This applies also to the space in the duct connecting 1 with 1-A. The shape and relative size of this zone between the two fixed beds can be controlled to give a desired effect. For example, in cases where it is desirable to promote chemical reactions in the completely fluidized solids with a large degree of freedom of movement and with heat exchange means (packed sections) adjacent above and below Figure 3 or a modification thereof is satisfactory. In other instances the grate, grid, or special supporting means for the non-fluidized solids in 1-A of Figure 3 may be omitted. Similarly, referring to Figure 1, the size of the fluidized-solids zone above the bed of fixed solids 2 may be large or small relative to the size of the bed of fixed solids when occasion demands. When it is large, and chamber 1 is connected to a chamber such as 1-A of Figure 3, the effect is the creation of a bed of freely moving particles between two zones in which the particles have their freedom of motion limited by fixed beds of non-fluidized large-size solids.

Reference has been made to the adaptability of the so-called "stationary" or non-fluidized solids shown at 2 in Figure 1, to be withdrawn from a low zone of the reaction chamber and to be fed into the latter zone above as through 52. A beneficial effect is obtained in promoting many reactions by causing the large-size non-fluidized solids to move vertically through the reactor and it is preferable in most cases that this travel be in a downward direction and at a slow rate. When, for example, there is any tendency for channeling of the fluid stream and/or a tendency for fines to deposit in portions of the bed of non-fluidized solids, such conditions vanish when the latter solids are caused to move. Deposits can form in the bed, for instance, when fine-size coal having ash of low fusion temperature is gasified in the non-fluidized bed and when carbon black is made at low rates of flow of the reactant fluid through the bed. When spheres or oval non-fluidized solids are used there are no flat areas where deposits can accumulate and deposition initiating from hinderance of downward travel of fine-size particles in the bed does not occur. Many fine-size particles which contain appreciable amounts of absorbed moisture show signs of agglomerating at ordinary temperatures but these, if sufficiently fine, will flow very well when the temperature is higher than about 200° F.

It will be understood that the use of traveling large-size solids as a bed, through a reaction zone while much smaller size particles are fluidized therein, to promote chemical reactions is not limited to cases where deposits might occur in the bed; rather, this procedure may be practiced in promoting any reaction. When causing reaction products to form by reacting CO with $H_2$, regardless of whether the large-size solids are catalytic or not, they may advantageously be caused to pass through the reaction zone during the passage of the fluidizing stream therethrough; the fluidizing stream initially contains the CO and $H_2$.

Referring again to Figure 3, with high rates of flow of the fluid stream up through 1 and 1-A it is desirable to employ some sort of packing which may be extra large size in the cross over from 1 to 1-A. In some cases it is desirable to employ packing continuously in 1, 1-A and in the cross over from 1 to 1-A. When oil shale is treated for products of pyrolysis and the crushed shale of small particle size is charged into 1-A through 50, the particles have for the period of pyrolysis a superficial or abnormally high buoyancy in the fluid stream and they tend to migrate upwardly during this period and then, when gas and vapor evolution is substantially complete, they have a relatively lower buoyancy in the fluidizing stream and tend to migrate downwardly. Advantage may be taken of this phenomenon in the following manner: The residue shale is allowed to migrate downwardly and sufficient air (or oxygen) and steam or other gasiform medium is introduced into 1 by controlling valves 27, 23, 20, 5 and 34 so that the mass of residue shale is fluidized and carbon of the residue is burned to give the residue in an upper layer of reactor 1 a temperature of the order of 850° to 1200° F. or higher, whereby the gaseous products of combustion and steam pass through the cross over from 1 to 1-A at a high temperature and contact the freshly charged shale (charged through 50 in 1-A). The sensible heat of the gas stream is imparted to the shale in 1-A and the volume of the said stream is such that the shale is substantially completely and continuously pyrolyzed in 1-A. The spent shale is discharged through valve 36 but it first gives up sensible heat to the steam and air introduced as described through 20 and 27. The products of pyrolysis in the fluid stream pass out through 6-A and 7-A at a temperature as chosen but preferably at about 700° to 900° F. One skilled in the art will recognize that variations can be practiced for the purpose of finer control, different effects or increased capacity by such expedients as introducing some air or oxygen through 50 simultaneously with the introduction of the shale and by introducing some shale through 16-A, or by fluidizing shale residue in 1 without packing but employing packing in 1-A for the purpose of causing a separation of the residue shale from the shale in process.

Having described my invention so that one skilled in the art can practice it in various modifications not limited to the specific examples, I claim:

1. The process of treating materials in a confined substantially fluidized bed of fine-size solids comprising passing a gasiform stream initially containing at least one reactant material upwardly through said bed at a rate at least sufficient to maintain the particles of said solids in a state of vibrating motion, said solids being substantially fluidized in said stream, while limiting to a narrow range the freedom of said particles for ebullient motion by virtue of much larger size stationary solids favorably placed in said bed, causing said material to react chemically in said stream while passing through said bed forming at least one valuable reaction product and at the same time to form a hot zone intermediate between the top and bottom of said bed, recovering said product, and substantially continuously flowing a stream of small-size solid particles downwardly through said bed and removing it substantially from beneath said bed, the solids thus removed being less buoyant in the said fluid stream than the said confined fluidized fine-size solids.

2. The process of treating materials comprising substantially fluidizing a bed of fine-size solids confined in a reaction chamber largely within a bed of large substantially uniformly sized stationary solids by passing a gasiform stream initially containing at least one reactant material upwardly through both beds at a favorable rate, whereby said fine-size solids have a limited degree of freedom of ebullient motion within the bed of large-size solids, maintaining a hot zone in a portion of the fluidized bed, causing said reactant material to react chemically while passing through said hot zone, meanwhile passing a stream of small-size solids having a buoyancy substantially less than that of the fluidized fine-sized solids substantially continuously downwardly through said fluidized bed through said hot zone contacting the said large size solids and the said upwardly moving stream in its downward passage as a heat exchange medium, removing the said stream of small-size solids substantially from beneath the fluidized bed of said fine-size solids, and recovering at least one valuable product of chemical reaction.

3. The process of treating materials and making products of chemical reaction in a bed of fluidized solids comprising fluidizing a bed of fine-size solids, confined in a reaction chamber at least partly within the interstices of a bed of much larger size stationary solids which latter solids are substantially alike in size in any one zone, by passing a gasiform stream, initially containing at least one reactant material, upwardly substantially continuously through both beds at a favorable rate, maintaining a hot zone common to both beds between the top and bottom thereof by promoting exothermic reactions therein in said fluid stream, thereby forming at least one valuable reaction product, recovering said reaction product, and passing a stream of small-size solids, having a buoyancy less than that of the confined fluidized fine-size solids, substantially continuously downwardly through both of said beds and removing it substantially from beneath the bed of fluidized fine-size solids.

4. The method set forth in claim 3 in which the said gasiform stream enters the said bed at a relatively low temperature, receives heat while passing through said hot zone and is cooled prior to exiting from the bed by the introduction of the small sized solids at the top of said bed.

WILLIAM W. ODELL.

REFERENCES CITED

The following references are of record in the file of this patent:

UNITED STATES PATENTS

| Number | Name | Date |
|---|---|---|
| 2,376,564 | Upham et al. | May 22, 1945 |
| 2,436,225 | Ogorzaly et al. | Feb. 17, 1948 |
| 2,443,673 | Atwell | June 22, 1948 |
| 2,448,290 | Atwell | Aug. 31, 1948 |
| 2,455,915 | Borcherding | Dec. 14, 1948 |